(12) United States Patent
Jochum

(10) Patent No.: US 10,118,793 B1
(45) Date of Patent: Nov. 6, 2018

(54) TOOL FOR TYING KNOTS WITH TWO CHORDS

(71) Applicant: Wolfgang Jochum, Yorktown Heights, NY (US)

(72) Inventor: Wolfgang Jochum, Yorktown Heights, NY (US)

(*) Notice: Subject to any disclaimer, the term of this patent is extended or adjusted under 35 U.S.C. 154(b) by 0 days.

(21) Appl. No.: 15/988,273

(22) Filed: May 24, 2018

(51) Int. Cl.
*B65H 69/04* (2006.01)
*D03J 3/00* (2006.01)
*A01K 91/04* (2006.01)

(52) U.S. Cl.
CPC .............. *B65H 69/04* (2013.01); *A01K 91/04* (2013.01); *D03J 3/00* (2013.01)

(58) Field of Classification Search
CPC ................................. B65H 69/04; A01K 91/04
See application file for complete search history.

(56) References Cited

U.S. PATENT DOCUMENTS

| | | | | |
|---|---|---|---|---|
| 337,637 | A * | 3/1886 | Thies ...................... | B65H 49/30 242/577.4 |
| 1,452,906 | A * | 4/1923 | Butler ..................... | B65H 69/06 289/17 |
| 2,263,916 | A * | 11/1941 | Boyle ..................... | D03D 29/00 289/17 |
| 2,469,037 | A | 5/1949 | Harvey | |
| 2,498,920 | A | 2/1950 | Holland | |
| 2,609,155 | A * | 9/1952 | Fosnaugh .............. | A01K 87/02 242/446 |
| 2,734,299 | A | 2/1956 | Masson | |
| 2,843,961 | A | 7/1958 | Semple | |
| 2,947,558 | A * | 8/1960 | Bethune, Jr. .......... | A01K 91/04 289/2 |
| D211,685 | S | 7/1968 | Hill ............................... | D22/31 |
| 3,498,656 | A | 3/1970 | Vargo | |
| D219,021 | S | 10/1970 | Graber .......................... | D22/31 |
| 3,700,272 | A | 10/1972 | Bauer ............................ | 289/17 |
| 3,787,081 | A | 1/1974 | Macy ............................ | 289/17 |
| 3,837,691 | A | 9/1974 | Smythe ......................... | 289/17 |
| 4,029,346 | A | 6/1977 | Browning ..................... | 289/17 |
| D247,713 | S | 4/1978 | Etes ............................. | D22/149 |
| 4,101,152 | A | 7/1978 | Gardipee ...................... | 289/17 |
| 4,188,052 | A | 2/1980 | Browning ..................... | 289/17 |
| 4,336,960 | A | 6/1982 | Seki ............................. | 289/17 |
| 4,400,025 | A | 8/1983 | Dennison ..................... | 289/17 |

(Continued)

FOREIGN PATENT DOCUMENTS

WO WO2010039020 4/2010 ............ A01K 91/04

*Primary Examiner* — Shaun R Hurley
(74) *Attorney, Agent, or Firm* — Christopher P. Maiorana, PC

(57) ABSTRACT

An apparatus includes a base, a first clamp, a second clamp, a first post, a first slot, a second post, a second slot, a rod, a catch and a channel. The first clamp may be attached to a first end of the base and configured to secure a first chord. The second clamp may be attached to a second end the base and configured to secure a second chord. The first post may be attached to the first end of the base. The first slot may reside in the first post opposite the base. The second post may be attached to the second end of the base. The second slot may reside in the second post opposite the base. The rod may be rigidly attached to the first post. The catch may be attached to the rod opposite the first post. The channel may reside in the catch.

11 Claims, 12 Drawing Sheets

(56) References Cited

U.S. PATENT DOCUMENTS

| | | | |
|---|---|---|---|
| 4,403,797 A | 9/1983 | Ragland, Jr. | 289/17 |
| 4,417,756 A | 11/1983 | Herke | 289/2 |
| 4,573,719 A | 3/1986 | Aldridge | 289/17 |
| 4,607,869 A | 8/1986 | Bersche | 289/17 |
| 4,613,173 A | 9/1986 | Rosser | 289/17 |
| 4,871,200 A | 10/1989 | Ryder et al. | 289/17 |
| 5,009,025 A | 4/1991 | Austad | 43/44.83 |
| 5,082,318 A | 1/1992 | Held et al. | 294/19.1 |
| 5,197,217 A | 3/1993 | Browning | 43/4 |
| 5,217,470 A | 6/1993 | Weston | 606/148 |
| 5,240,295 A | 8/1993 | Spencer | 289/1.5 |
| 5,397,326 A * | 3/1995 | Mangum | A61B 17/0469 289/17 |
| 5,593,189 A | 1/1997 | Little | 289/17 |
| 5,685,037 A | 11/1997 | Fitzner et al. | 7/106 |
| 5,690,369 A | 11/1997 | Steck, III | 289/17 |
| 5,690,370 A * | 11/1997 | Steck, III | A01K 91/047 289/17 |
| 6,082,785 A * | 7/2000 | Morgan | A63H 27/10 289/17 |
| D572,095 S * | 7/2008 | Jochum | D22/149 |
| 7,419,195 B1 | 9/2008 | Jochum | 289/17 |
| 8,157,297 B2 | 4/2012 | Spilbor et al. | 289/17 |
| 8,167,230 B2 * | 5/2012 | McLawhorn | A61F 2/0063 242/402 |
| 8,511,722 B1 | 8/2013 | Farner et al. | 289/17 |
| 8,794,680 B2 | 8/2014 | Frew | 289/17 |
| 9,332,745 B2 | 5/2016 | Mashhour | |
| 2009/0302606 A1 * | 12/2009 | Chermanski | A01K 91/04 289/17 |

\* cited by examiner

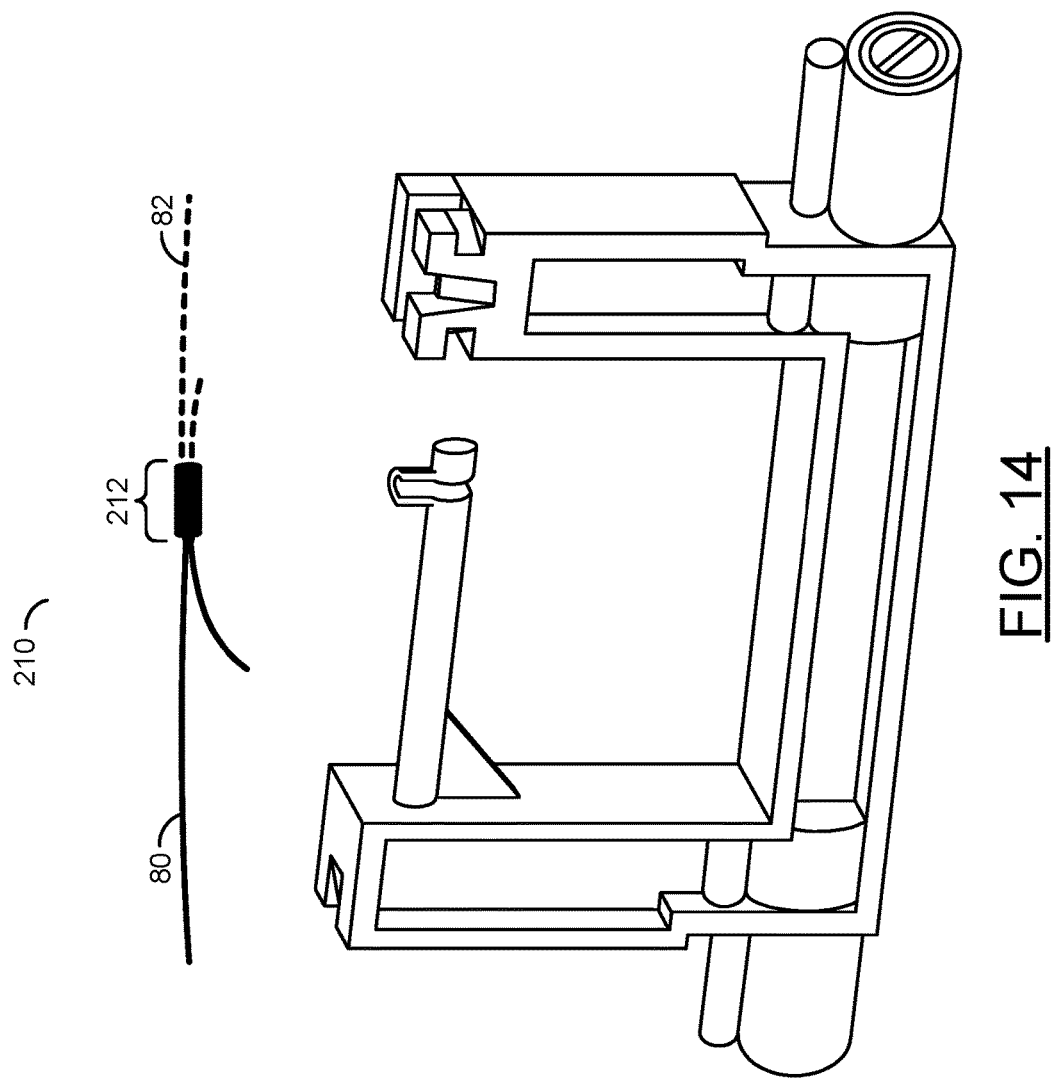

TOOL FOR TYING KNOTS WITH TWO CHORDS

FIELD OF THE INVENTION

The invention relates to knot tying generally and, more particularly, to a method and/or apparatus for implementing a tool for tying knots with two chords.

BACKGROUND

Knots provide a useful mechanism for securing two chords to each other. The knots include segments interwoven to bind to the two chords together. Problems commonly arise for a user trying to manipulate the chords with only two hands. Often, a first chord is positioned along a straight line while a second chord is wrapped around the first chord. Holding the first chord in place with one hand while manipulating the second chord with the other hand is difficult.

It would be desirable to implement a tool for tying knots with two chords.

SUMMARY

The invention concerns an apparatus including a base, a first clamp, a second clamp, a first post, a first slot, a second post, a second slot, a rod, a catch and a channel. The first clamp may be attached to a first end of the base and configured to secure a first chord. The second clamp may be attached to a second end the base and configured to secure a second chord. The first post may be attached to the first end of the base. The first slot may reside in the first post opposite the base. The second post may be attached to the second end of the base. The second slot may reside in the second post opposite the base. The rod may be rigidly attached to the first post. The catch may be attached to the rod opposite the first post. The channel may reside in the catch.

BRIEF DESCRIPTION OF THE FIGURES

Embodiments of the invention will be apparent from the following detailed description and the appended claims and drawings in which:

FIG. 14 is a diagram of a final configuration of the chords for the Alberto knot in accordance with an embodiment of the invention.

DETAILED DESCRIPTION OF THE EMBODIMENTS

Embodiments of the present invention include providing a tool for tying knots with two chords that may (i) be compact, (ii) be single hand holdable, (iii) be convenient to use, (iv) tie break proof knots and/or (v) independently secure and release two different chords.

Embodiments of the invention generally provide a knot tying tool and methods for tying knots in two or more cords (or lines). The knot tying tool may provide a compact, single hand-holdable device that is simple and convenient to use, and easy to carry and store. The knot tying tool may enable a user to tie knots that are break proof. The knot tying tool may be used to form knots in a way that minimizes adverse weakening of the chords at the knot, and limits the slipping or loosening of the knot during use. The knot tying tool may be inexpensive to fabricate and implement.

The chords may be tied together in knots through specific combinations of tying and/or interweaving. The knots may include one or more segments interwoven to secure the chords to each other and/or to some other object (or the load). The knots may include, but are not limited to, an Albright knot, an Alberto knot, a FG knot, a Loop knot, an improved Clinch knot, a Trilene knot, a San Diego knot, and Antini knot and the like. Other types of knots may be implemented to meet the criteria of a particular application. The knots may be used in various domestic, recreational, occupational and/or industrial settings.

The chords may refer to a line, a string, a rope, a cable, a thread, a fiber, a webbing, a twine, a strap and/or the like. The chords are generally fabricated from natural material and/or artificial material. The natural materials may include, but are not limited to cotton, silk, wool and the like. The artificial materials may include, but are not limited to nylon, polyethylene, Dacron, copolymers, fluorocarbon and the like. A common type of chord is a monofilament chord having a single-stranded line. Other types of chords may include multi-filament chords having multi-stranded lines.

Figure 1:
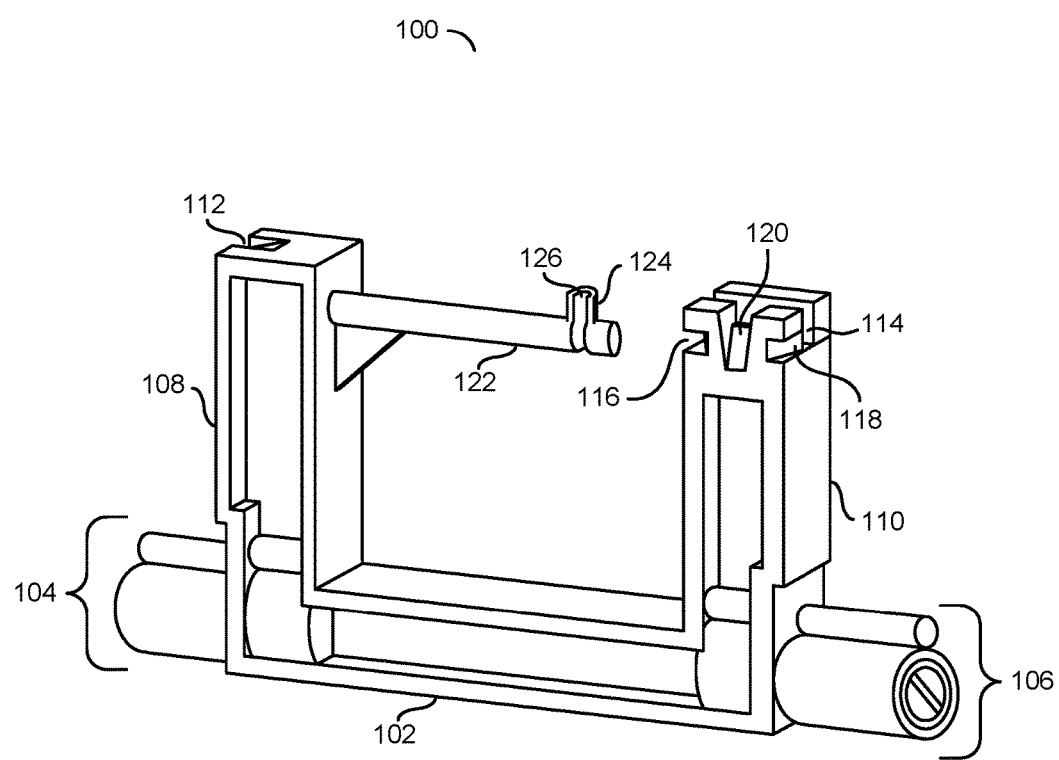
FIG. 1 is a diagram of a perspective front view of a knot tying tool in accordance with an embodiment of the invention.
Figure 2:
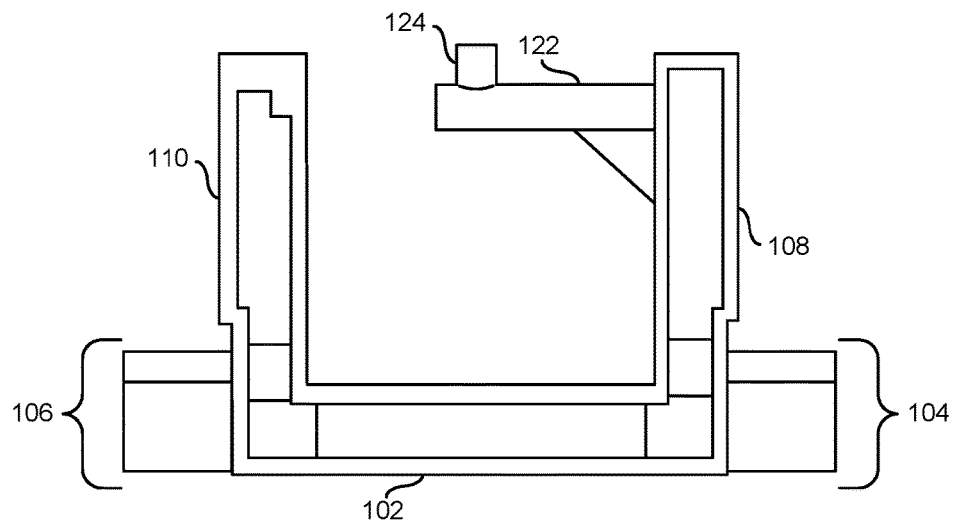
FIG. 2 is a diagram of a side view of the knot tying tool of FIG. 1 in accordance with an embodiment of the invention.
Figure 3:
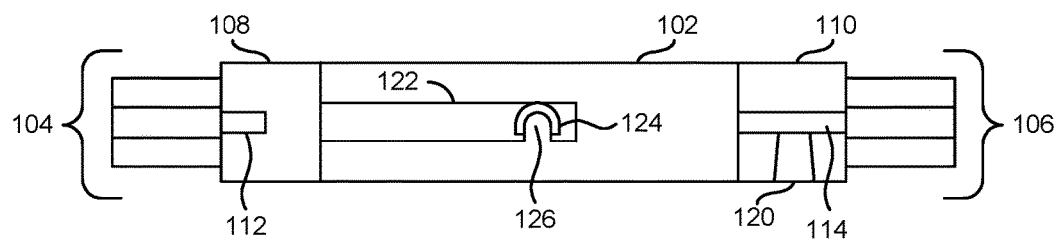
FIG. 3 is a diagram of a top view of the knot tying tool of FIG. 1 in accordance with an embodiment of the invention.

Referring to FIG. 1, a diagram of a perspective front view of a knot tying tool 100 is shown in accordance with an embodiment of the invention. Referring to FIG. 2, a diagram of a side view of the knot tying tool 100 is shown in accordance with an embodiment of the invention. Referring to FIG. 3, a diagram of a top view of the knot tying tool 100 in show in accordance with an embodiment of the invention.

The knot tying tool (or tool for short) 100 generally comprises a base (or support) 102, a clamp (or retainer) 104, a clamp (or retainer) 106, a post (or column) 108, a post (or column) 110, a slot (or notch) 112, a slot (or channel) 114, a slot (or notch) 116, a slot (or notch) 118, a slot (or notch) 120, a rod (or pole) 122, a catch 124 and a channel (or groove) 126. The base 102 and elements 108-124 may be implemented with a hard plastic and/or similar material. The clamps 104 and 106 may be implemented with rubber, plastic, metal and/or similar materials.

The base 102 may implement a rectangular shape. The base 102 is generally operational to enable the tool 100 to be hand-held with a single hand of a user (or person). The base 102 may be opposing ends along a major axis.

Each clamp 104 and 106 may implement a rotatably actuated clamp assembly. Each clamp 104 and 106 is generally operational to alternately secure and release one or more chords. The clamp 104 may be attached to one end of the base 102. The clamp 106 may be attached to another end of the base 102, opposite the clamp 104.

Each post 108 and 110 may implement a rectangular shape. The posts 108 and 110 are generally operational to provide a spacing between the base 102 and a working area where the knots are formed. The post 108 may be attached to the base 102 proximate the clamp 104. The post 110 may be attached to the base 102 proximate the claim 106. Each post 108 and 110 are generally perpendicular to the major axis of the base 102. Both posts 108 and 110 may be aligned in parallel to each other.

The slot 112 may be formed in a surface of the post 108 opposite the base 102. In various embodiments, the slot 112 may be sloped relative to the post 108 and cut into a corner of the post 108. The slot 112 is generally aligned parallel to the major axis of the base 102. The slot 112 may have a width sufficient to receive multiple chords at a time.

The slot 114 may be formed in a surface of the post 110 opposite the base 102. In various embodiments, the slot 114 may extend across the full surface of the post 108. The slot 114 is generally aligned parallel to the major axis of the base 102. The slot 114 may have a width sufficient to receive multiple chords at a time.

The slots 116 and 118 may be formed in corners of the post 110 and proximate the slot 114. In various embodiments, the slots 116 and 118 may be sloped and cut into neighboring corners of the post 110. The slot 116 may be formed in a corner facing toward the post 108. The slot 118 may be formed in a corner facing away from the post 108. The slots 116 and 118 may share a common face of the post 110. The slots 116 and 118 are generally aligned perpendicular to the major axis of the base 102 and oriented parallel to each other. Each slot 116 and 118 may have a width sufficient to receive multiple chords at a time.

The slots 116 and 118 may form a loop-retainer portion. The loop-retainer portion generally extends along at least a portion of a periphery of the post 110. The loop retaining portion is generally configured to retain one or more loops of one or more chords forming part of the various knots. The slots 116 and 118 may hold the loop of chord in place during the formation of the knots. The slots 116 and 118 may function to prevent the loop of chord from slipping.

The groove 120 may be formed in the surface of the post 110 opposite the base 102. In various embodiments, the groove 120 may be sloped relative to the post 110 and cut into a corner of the post 110. The groove 120 is generally aligned perpendicular to the major axis of the base 102. The groove 120 may have a width sufficient to receive multiple chords at a time. The groove 120 may be configured to facilitate passage of a working end of a chord through an inside portion of the retained one or more loops secured on the loop retaining portion.

The rod 122 may implement a guide rod secured to the post 108 opposite the base 102. The rod 122 may be rigidly attached to the post 108. The rod 122 is generally aligned parallel to the base 102 and extends from the post 108 toward the post 110. A gap may exist between a free end of the rod 122 and the post 110.

The catch 124 may be implemented as a projection or short stud extending radially from the free end of the rod 122. The catch 124 generally extends a short distance away from the rod 122. The catch 124 generally expands a space in a retained loop of a chord, thus enhancing the handling and manageability of the retained loop during forming of the knots.

The channel 126 may be formed in the catch 124 perpendicular to the major axis of the base 102. The catch 124 and the channel 126 may be positioned to hold onto a portion of at least one loop of a chord and at a distance from the post 110.

Figure 4:
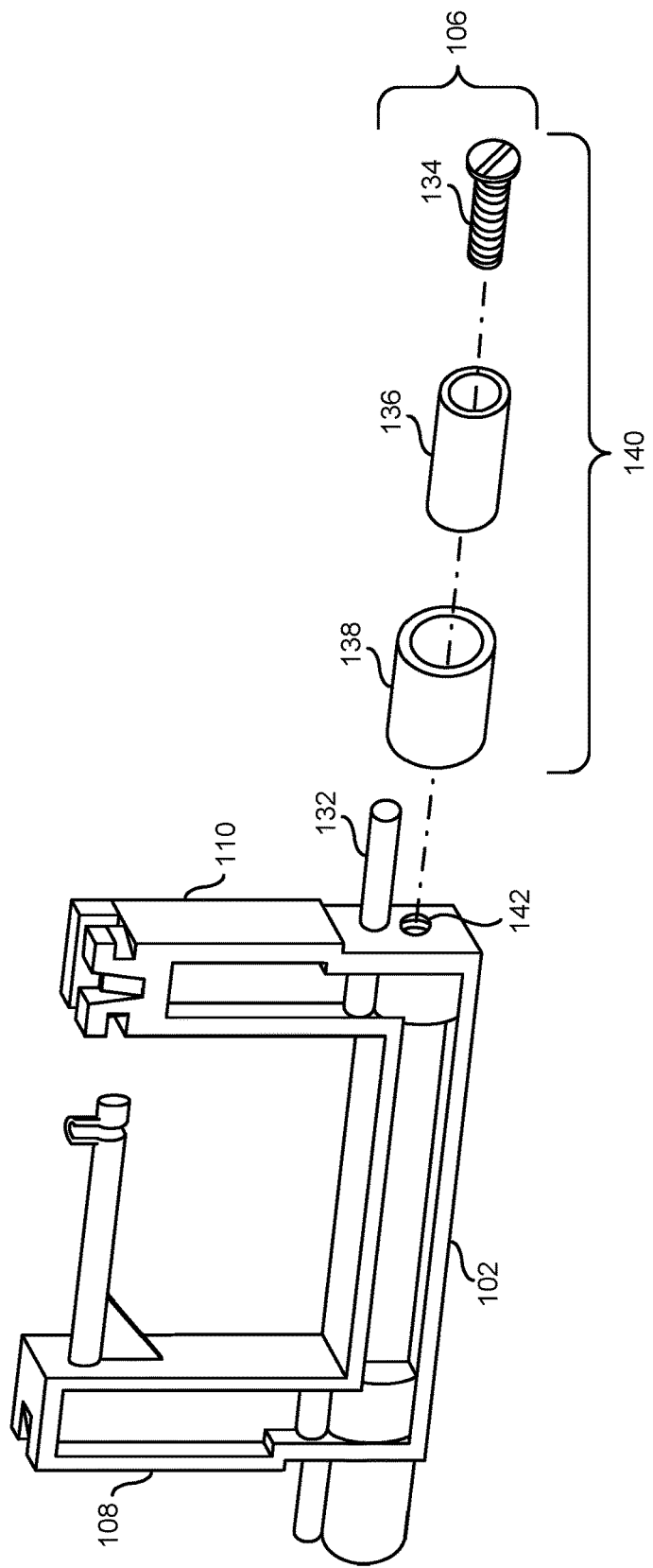
FIG. 4 is a diagram of an exploded view of a clamp in accordance with an embodiment of the invention.

Referring to FIG. 4, a diagram of an exploded view of the clamp 106 is shown in accordance with an embodiment of the invention. The clamp 104 may be similar to the claim 106. The clamp 104 may be mounted on an opposite side of the base 102 as the clamp 106. The clamp 106 generally comprises a pin (or dowel) 132, a screw (or fastener) 134, a tubular member 136 and an outer covering 138. The screw 134, the tubular member 136 and the outer covering 138 together may form a rotatable eccentric stud 140. A threaded hole 142 may be provided in the base 102 to hold the rotatable eccentric stud 140.

The pin 132 may be implemented as a ridged pin. In various embodiments, the ridged pin 132 may be formed from a metal. The pin 132 is generally attached to the base 102 above the threaded hole 142. A length of the pin 132 extending away from the base 102 generally matches that of the rotatable eccentric stud 140.

The screw 134 may be implemented as a threaded screw. In various embodiments, the screw 134 may be implemented with a metal. The screw 134 may be sized to engage the threaded hole 142. The screw 134 is generally operational to fasten the tubular member 136 to the base 102.

The tubular member 136 may implement an eccentric tubular member. In various embodiments, the tubular member 136 may be formed from a ridged material, such as a metal. A cross section of the tubular member 136 may be eccentrically shaped with a center offset from the screw 136 to create a projecting portion and an opposing recessed portion. The tubular member 136 may be rotatable about the screw 134.

The outer covering 138 may be implemented as a cylindrical outer covering. The outer covering 136 may be disposed about the tubular member 136. The outer covering 136 may be formed of a resilient material (e.g., rubber or a soft plastic tubing). The resilient material for the outer covering 138 is generally selected to enhance safe grasping of the chords, while substantially minimizing excessive nicking, bending or stretching in the chords.

The tubular member 136 and the outer covering 138 may be rotatably mounted on an end of the base 102 via the screw 134. The screw 134 may be inserted into an inside bore of the tubular member 136. The tubular member 136 may be inserted into an inside bore of the outer covering 138 with an end of the screw 134 protruding therefrom. The screw 134 is generally threaded into the threaded hole 142 in the base 102. When the rotatable eccentric stud 140 is rotated about the screw 132, the eccentric shape of the tubular member 136 generally produces a smooth reciprocating motion relative to the pin 132. The reciprocating motion may be used to secure and release one or more chords between the rotatable eccentric stud 140 and the pin 132.

Figure 5:
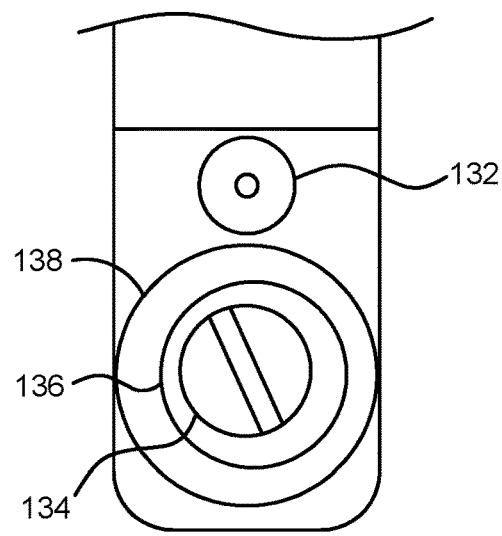
FIG. 5 is a diagram of a clamp in a released configuration in accordance with an embodiment of the invention.

Referring to FIG. 5, a diagram of a clamp 104/106 is shown in a released configuration in accordance with an embodiment of the invention. In the released configuration, the rotatable eccentric stud 140 may be rotated such that a gap exists between the pint 132 and the outer covering 138. A maximum gap created by the rotatable eccentric stud 140 may be sufficient to insert and/or remove one or more chords between the pin 132 and the rotatable eccentric stud 140.

Figure 6:
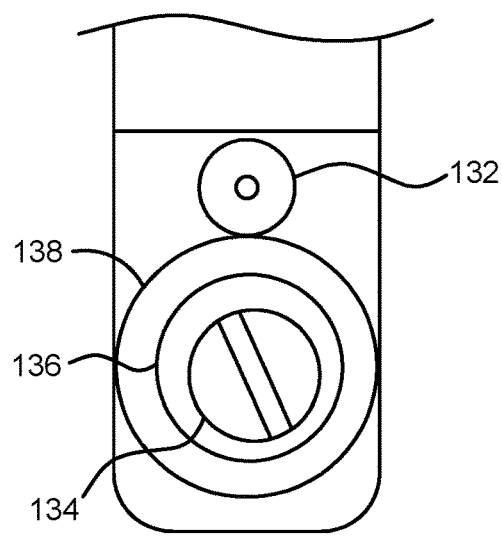
FIG. 6 is a diagram of the clamp of FIG. 5 in a secured configuration in accordance with an embodiment of the invention.

Referring to FIG. 6, a diagram of a clamp 104/106 is shown in a secured configuration in accordance with an embodiment of the invention. In the secured configuration, the rotatable eccentric stud 140 may be rotated such that the outer covering 138 contacts with the pin 132 in a cam-like manner. The figure generally illustrates a situation where no chords are present between the pin 132 and the rotatable eccentric stud 140. In situations where one or more chords are disposed between the pin 132 and the rotatable eccentric stud 140, the chords may be compressed and restrained between the pin 132 and the outer covering 138.

Figure 7:
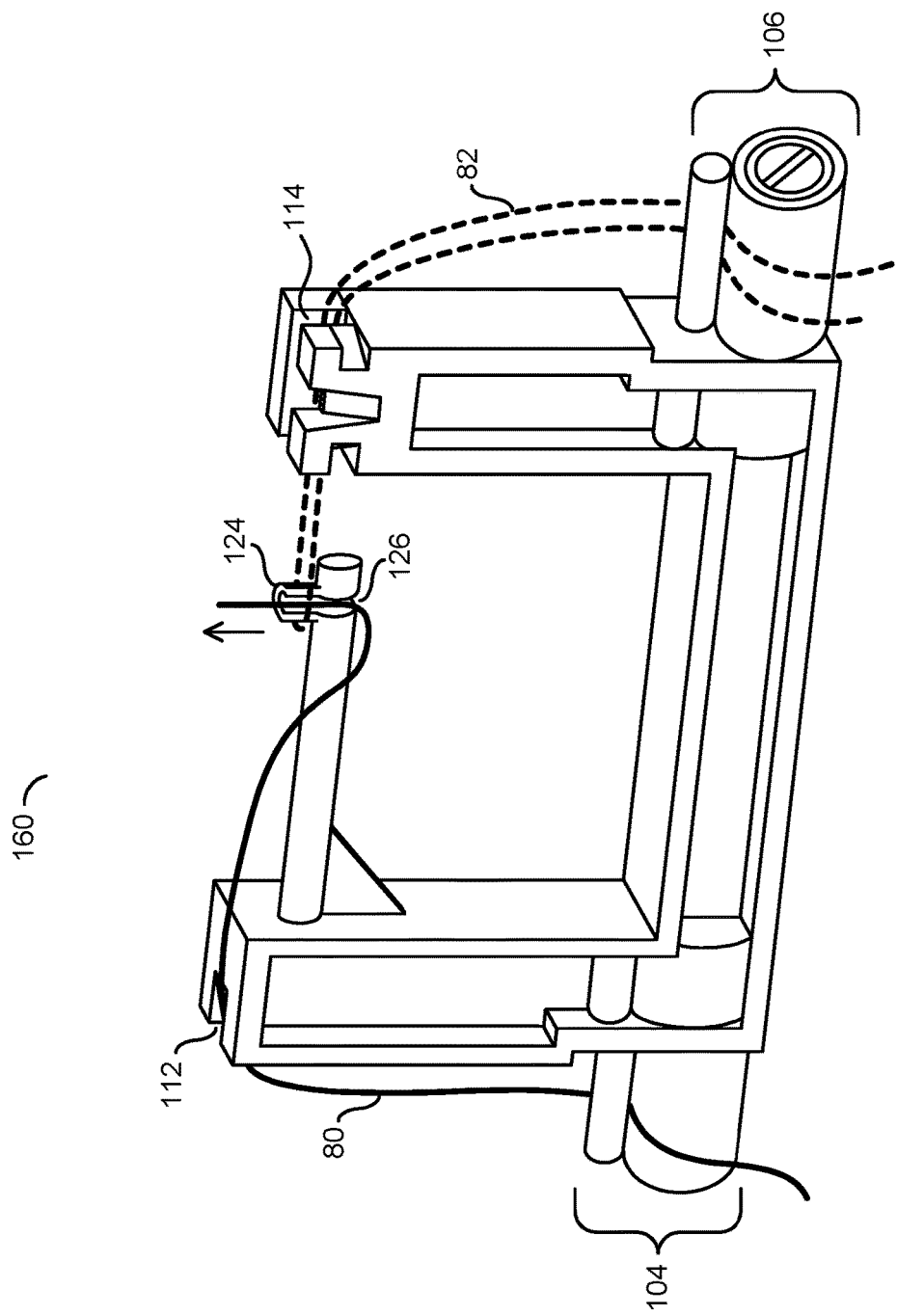
FIG. 7 is a diagram of an initial configuration of two chords while tying an Albright knot using the tool of FIG. 1 in accordance with an embodiment of the invention

Referring to FIGS. 7 to 10, a method (or process) of tying a knot with two chords using the tool 100 is show in accordance with an embodiment of the invention. Referring to FIG. 7, a diagram of an initial configuration 160 of a chord 80 and another chord 82 while tying an Albright knot is shown in accordance with an embodiment of the invention. A user may provide the tool 100, a length of the chord 80 and a length of the chord 82. In some embodiments, the chords 80 and 82 may be made of the same material. In other embodiments, the chords 80 and 82 may be made of different materials.

The chord 82 may be looped around the catch 124. Both ends of the chord 82 may be passed through the slot 114 and secured in the clamp 106. A standing end of the chord 80 may be secured to the clamp 104. A central part of the chord 80 may be passed through the slot 112. A working end of the chord 80 may be passed through the channel 126 of the catch 124, and thus through the loop formed by the chord 82. In various embodiments, the initial pass of the working end of the chord 80 through the channel 126/loop moving away from the base 102. In other embodiments, the initial pass of the working end of the chord 80 through the channel 126/loop moving toward the base 102.

Figure 8:
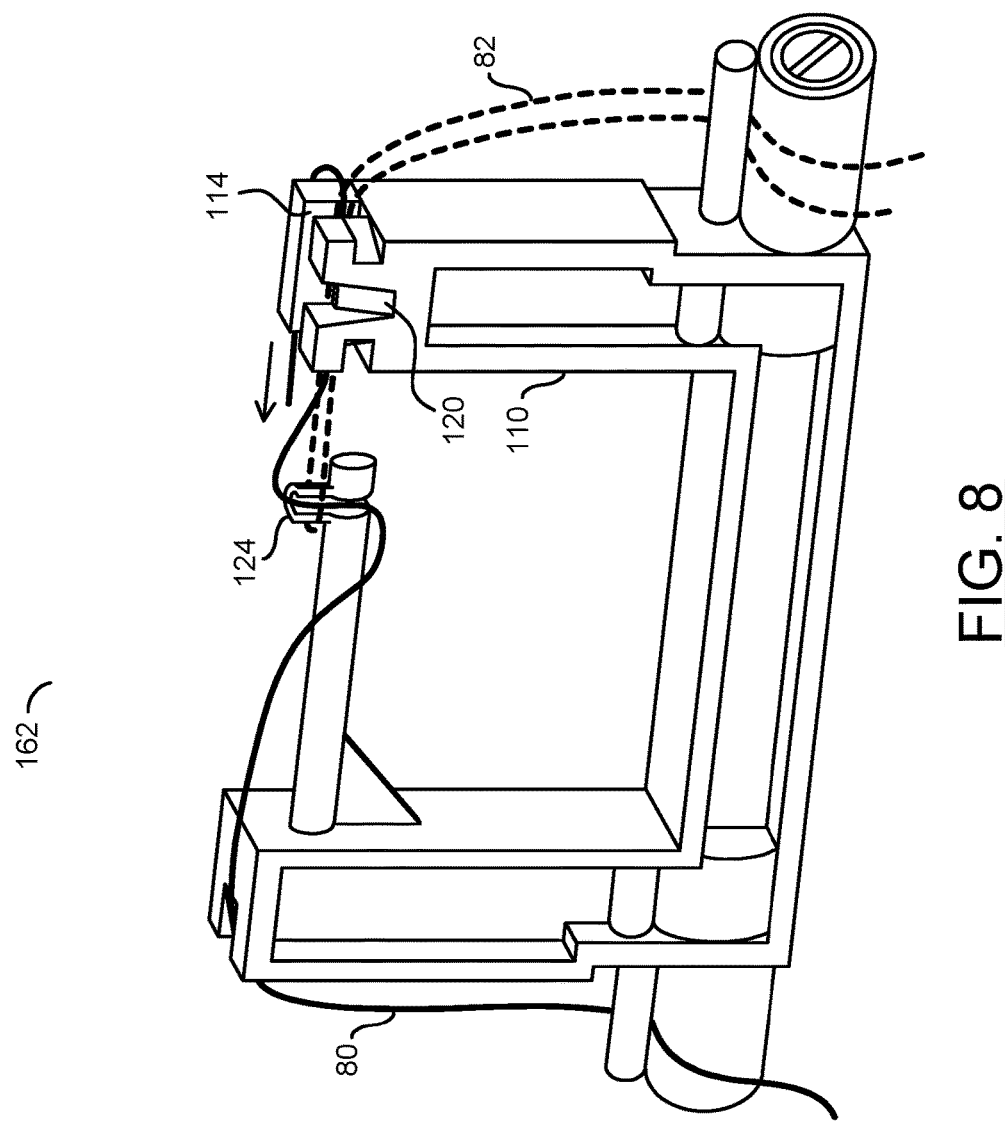
FIG. 8 is a diagram of a first intermediate configuration of the chords for the Albright knot in accordance with an embodiment of the invention.

Referring to FIG. 8, a diagram of a first intermediate configuration 162 of the chords 80 and 82 for the Albright knot is shown in accordance with an embodiment of the invention. The chord 80 may be passed through the slot 114 and wrapped around half the post 110 so that the working end is toward the catch 124. In various embodiments, the chord 80 may be wrapped around a side of the post 110 opposite the slot 120. In other embodiments, the chord 80 may be wrapped around a side of the post 110 that includes the slot 120.

Figure 9:
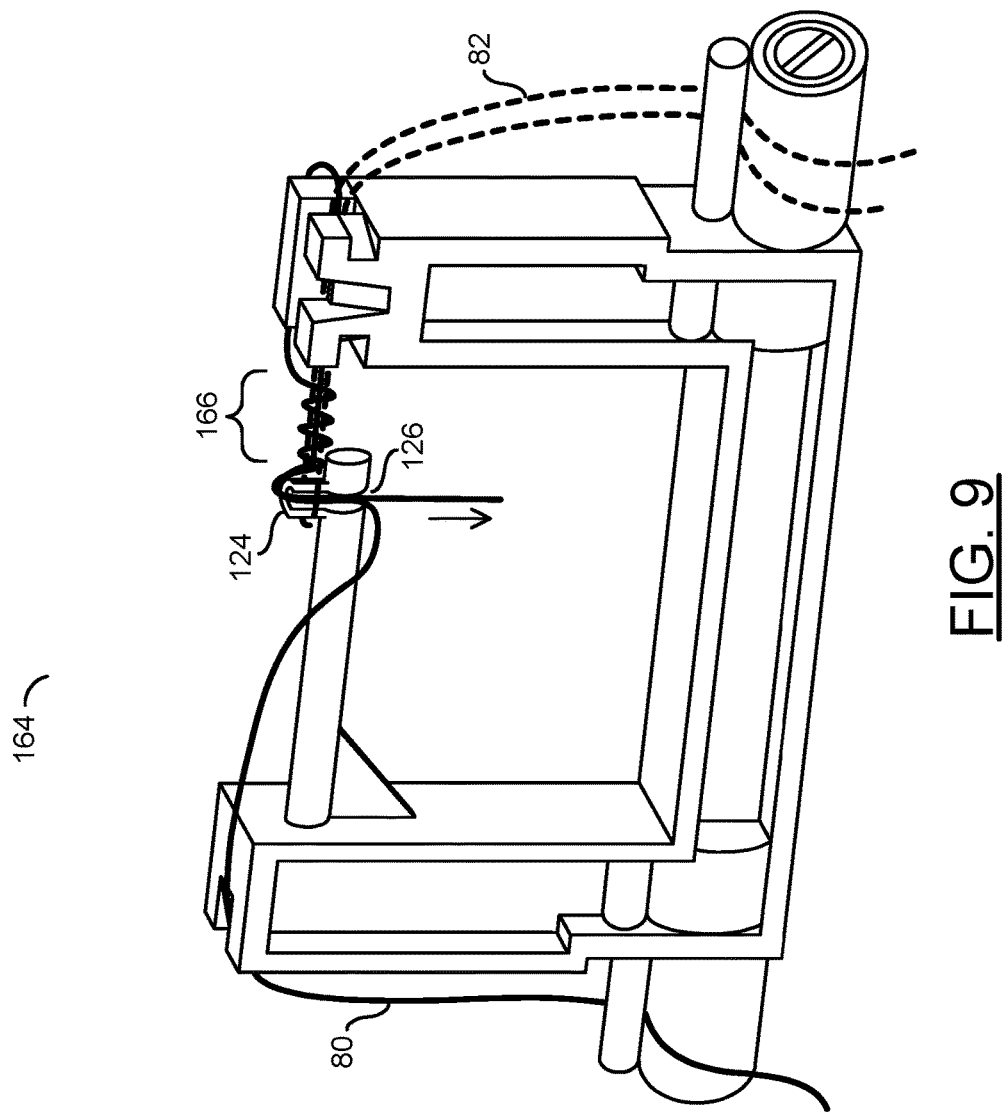
FIG. 9 is a diagram of a second intermediate configuration of the chords for the Albright knot in accordance with an embodiment of the invention.

Referring to FIG. 9, a diagram of a second intermediate configuration 164 of the chords 80 and 82 for the Albright knot is shown in accordance with an embodiment of the invention. The chord 80 may be wrapped multiple times around a portion 166 of the chord 82 (e.g., both sides of the chord 82 that make up the loop) between the post 110 and the catch 124. Each wrap of the chord 80 around the chord 82 generally advances the chord 80 in a direction from the post 110 toward the catch 124. In some embodiments, the wrapping of the chord 80 may occur between six and twelve times around the chord 82. Other numbers of wraps may be implemented to meet the criteria of a particular application. After wrapping, the working end of the chord 80 may be passed back through the channel 126 and the loop formed by the chord 82. In various embodiments, the second pass of the working end of the chord 80 through the channel 126/loop may be in an opposite direction as the first pass through the channel 126/loop. In some embodiments, both passes of the working end of the chord 80 may be in the same direction through the channel 126/loop.

Figure 10:
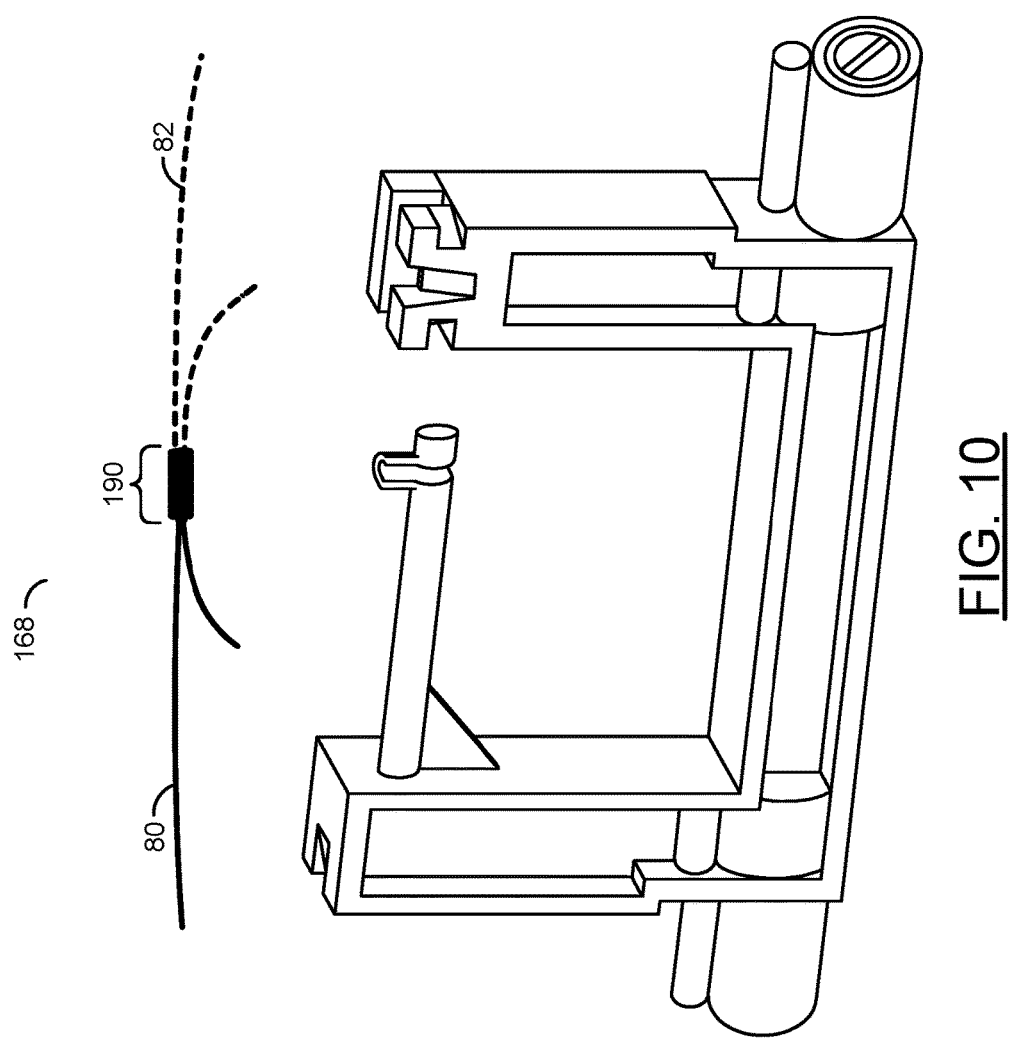
FIG. 10 is a diagram of a final configuration of the chords for the Albright knot in accordance with an embodiment of the invention.

Referring to FIG. 10, a diagram of a final configuration 168 of the chords 80 and 82 for the Albright knot is shown in accordance with an embodiment of the invention. Both clamps 104 and 106 may be opened to release the chords 80 and 82. The standing end of the chord 80 and an end of the chord 82 may be pulled by the user to tighten the chords 80 and 82 to each other thereby finishing the Albright knot 190. Unused loose ends of the chords 80 and 82 may be trimmed to an appropriate length.

Figure 11:
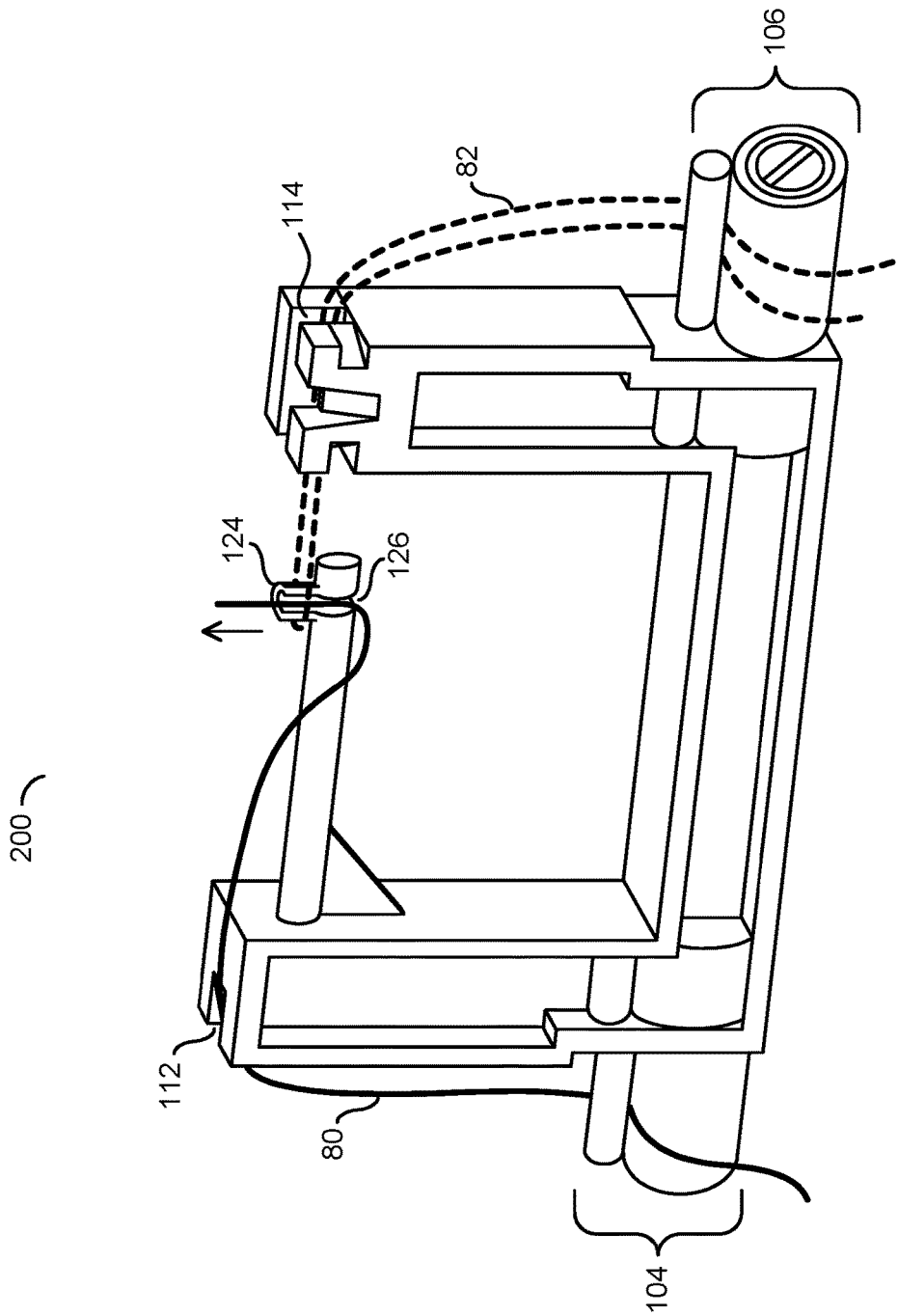
FIG. 11 is a diagram of an initial configuration of two chords while tying an Alberto knot using the tool of FIG. 1 in accordance with an embodiment of the invention.

Referring to FIGS. 11 to 14, a method of tying another knot with two chords using the tool 100 is show in accordance with an embodiment of the invention. Referring to FIG. 11, a diagram of an initial configuration 200 of the chord 80 and the chord 82 while tying an Alberto knot is shown in accordance with an embodiment of the invention. A user may provide the tool 100, a length of the chord 80 and a length of the chord 82. In some embodiments, the chords 80 and 82 may be made of the same material. In other embodiments, the chords 80 and 82 may be made of different materials.

The chord 82 may be looped around the catch 124. Both ends of the chord 82 may be passed through the slot 114 and secured in the clamp 106. A standing end of the chord 80 may be secured to the clamp 104. A central part of the chord 80 may be passed through the slot 112. A working end of the chord 80 may be passed through the channel 126 of the catch 124, and thus through the loop formed by the chord 82. In various embodiments, the initial pass of the working end of the chord 80 through the channel 126/loop moving away from the base 102. In other embodiments, the initial pass of the working end of the chord 80 through the channel 126/loop moving toward the base 102.

Figure 12:
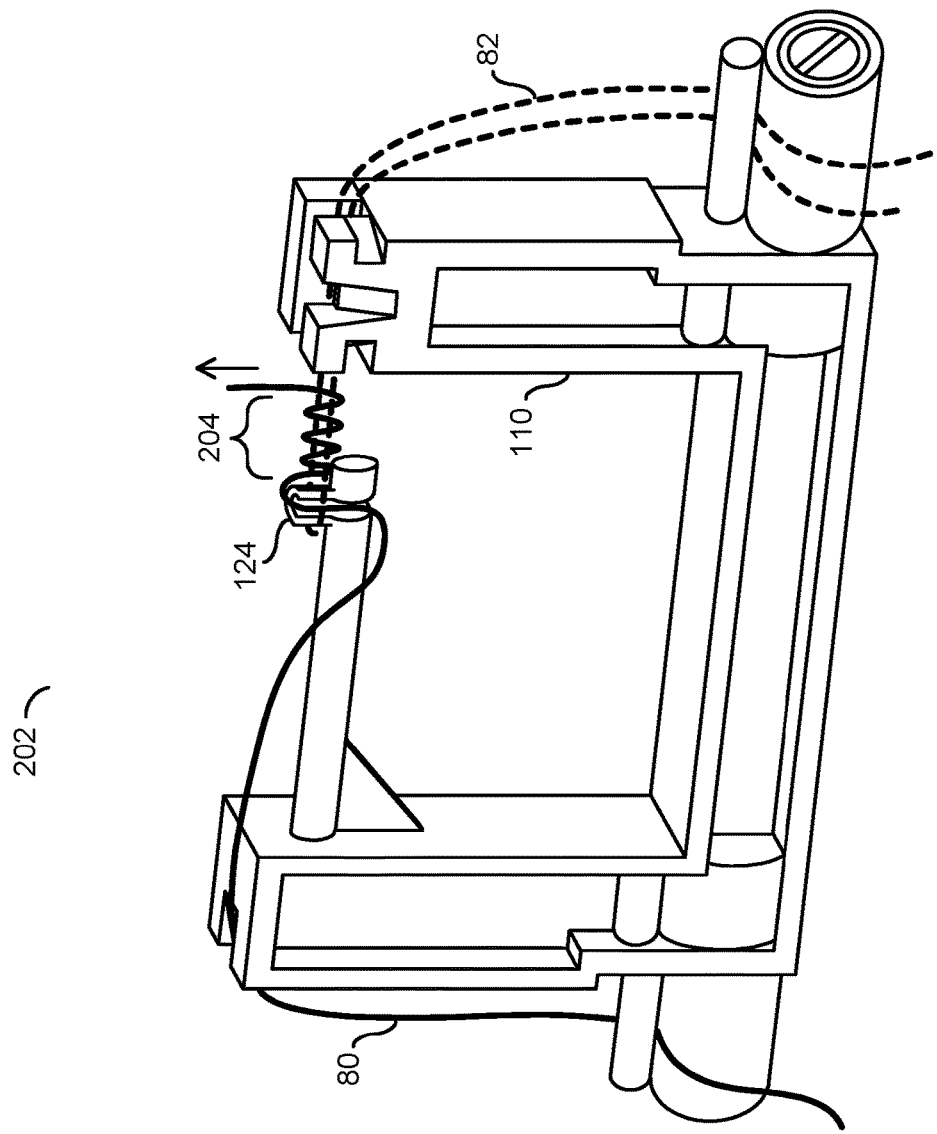
FIG. 12 is a diagram of a first intermediate configuration of the chords for the Alberto knot in accordance with an embodiment of the invention.

Referring to FIG. 12, a diagram of a first intermediate configuration 202 of the chords 80 and 82 for the Alberto knot is shown in accordance with an embodiment of the invention. The user may initially wrap the chord 80 multiple times around a portion 204 of the chord 82 (e.g., both halves of the chord 82 that form the loop). Each initial wrap may advance the chord 80 in a direction from the catch 24 toward the post 110. The initial wraps may range from six to twelve times around the chord 82. Other numbers of initial wraps may be implemented to meet the criteria of a particular application.

Figure 13:
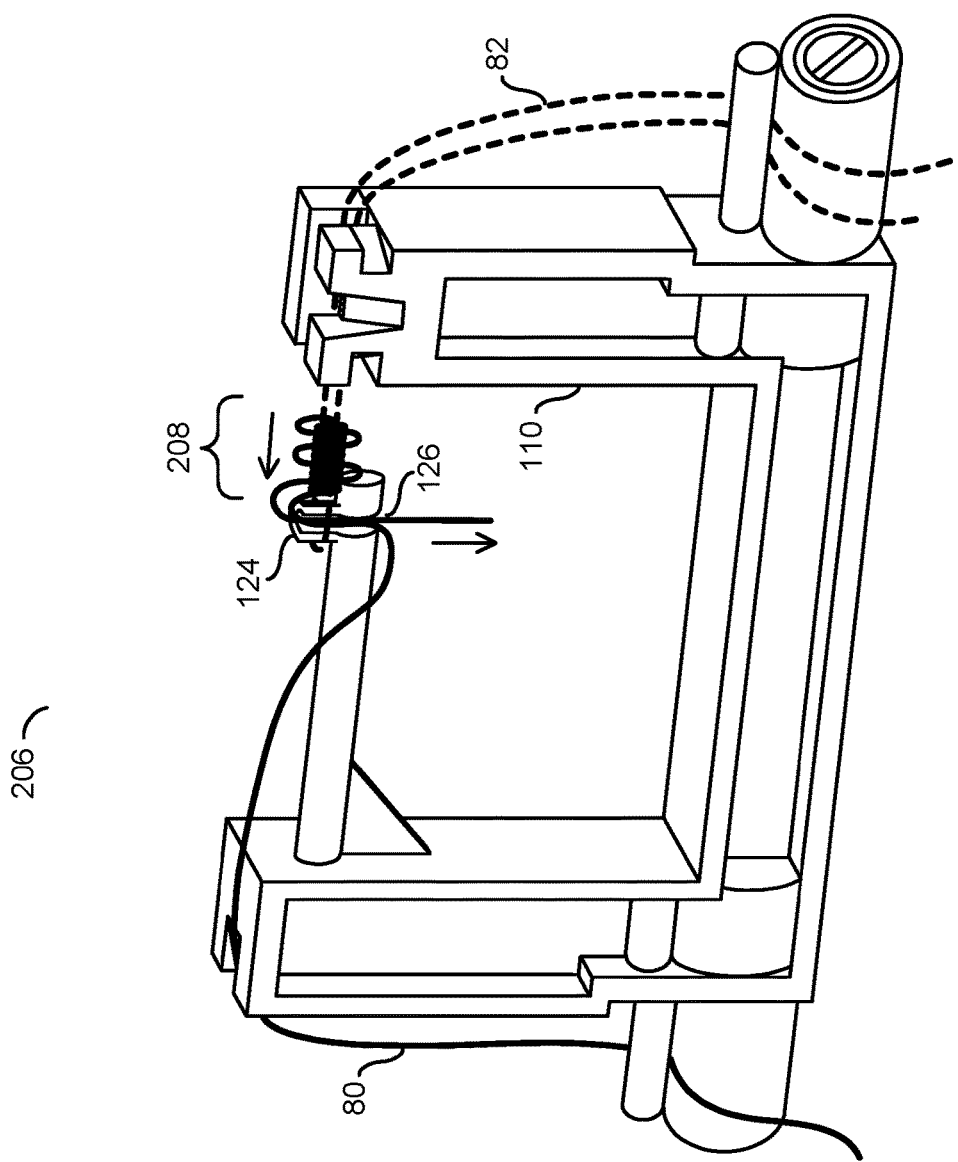
FIG. 13 is a diagram of a second intermediate configuration of the chords for the Alberto knot in accordance with an embodiment of the invention.

Referring to FIG. 13, a diagram of a second intermediate configuration 206 of the chords 80 and 82 for the Alberto knot is shown in accordance with an embodiment of the invention. After the initial wraps have been made, the user may subsequently wrap the chord 80 multiple times around a portion 208 of the chord 82 (e.g., both halves of the chord 82 that form the loop). Each subsequent wrap may advance the chord 80 in a direction from the post 110 toward the catch 124. The subsequent wraps may be made over (on top of) the initial wraps. The subsequent wraps may range from six to twelve times around the chord 82. Other numbers of subsequent wraps may be implemented to meet the criteria of a particular application. After wrapping, the working end of the chord 80 may be passed back through the channel 126 and the loop formed by the chord 82. In various embodiments, the second pass of the working end of the chord 80 through the channel 126/loop may be in an opposite direction as the first pass through the channel 126/loop. In some embodiments, both passes of the working end of the chord 80 may be in the same direction through the channel 126/loop.

Referring to FIG. 14, a diagram of a final configuration 210 of the chords 80 and 82 for the Alberto knot is shown in accordance with an embodiment of the invention. Both clamps 104 and 106 may be opened to release the chords 80 and 82. The standing end of the chord 80 and an end of the chord 82 may be pulled by the user to tighten the chords 80 and 82 to each other thereby finishing the Alberto knot 212. Unused loose ends of the chords 80 and 82 may be trimmed to an appropriate length. Additional details for other embodiments of the tool 100 and methods for tying other knots with the tool 100 may be found in U.S. Pat. No. 7,419,195, filed Dec. 18, 2007, which is hereby incorporated by reference in its entirety.

The tool 100 may be used to tie other types of knots. For example, the tool 100 may be used to tie the FG knot. The FG knot may begin with securing one end of the chord 80 in the clamp 104 and the other end of the chord 80 the clamp 106, with a V shape formed between the clamp 104 and the clamp 106. The chord 82 may be passed through a hole formed by the V shape of the chord 80 and the base 102 of the tool 102. The chord 82 may subsequently be wrapped a plurality of times through the hole, alternating around a first side of the V shape of the chord 80 and a second side of the V shape of the chord 80. The chord 82 may be tightening around the chord 80. A free end of the chord 80 may be released from one of the clamps 104 or 106 clamp while the other end of the chord 80 remains secured to the base 102 via the other clamp 104 or 106. A plurality of first half-hitch knots (e.g., 2 to 5 knots) made be made with the free end of the chord 80 around both the clamped end of the chord 80 and the chord 82. Each first half-hitch generally advances toward the base 102. The free end of the chord 80 may be tightened around the clamped end of chord 80 and the chord 82. A plurality of second half-hitch knots (e.g., 2 to 5 knots) may be made with the chord 82 around both the clamped end of the chord 80 and the free end of the chord 80. Each of the second half-hitch generally advances toward the base 102. The clamped end of the chord 80 may be released from the base 102. Finally, the chord 80 and the chord 82 may be tightened to each other.

The tool 100 may be used to tie a Loop knot. The Loop knot may begin with securing one end of the chord 80 in the clamp 104. A free end of the chord 80 may be brought through the slot 112 and around the post 110. The chord 80 may go through the slot and make a small loop. The free end of the chord 80 may be passed through the channel 126 on the catch 124, around the post 110 again one time, and through an eye of a hook (e.g., fishing hook). The free end of the chord 80 may be wrapped around the main chord several (e.g., 5 to 6) times. Next, the chord 80 may be passed through the slot 114 and a make a half-hitch knot. The secured end of the chord 80 may be removed from the clamp 104 and the knot pulled tight.

The tool 100 may be used to tie a Clinch knot. The Clinch knot may begin with securing one end of the chord 80 in the clamp 104. A free end of the chord 80 may be brought through the slot 112, through the eye of the hook, and around the post 110. The free end of the chord 80 may be wrapped around the main chord several (e.g., 5 to 6) times. Next, the chord 80 may be passed through the slot 114 and a make a half-hitch knot. The secured end of the chord 80 may be removed from the clamp 104 and the knot pulled tight.

The tool 100 may be used to tie a Trilene knot. The Trilene knot may begin with securing one end of the chord 80 in the clamp 104. A free end of the chord 80 may be brought through the slot 112, through the eye of the hook, and around the post 110. The free end of the chord 80 may be wrapped around the main chord several (e.g., 5 to 6) times. Next, the chord 80 may be passed through the slot 114. The secured end of the chord 80 may be removed from the clamp 104 and the knot pulled tight.

The tool 100 may be used to tie a San Diego knot. The San Diego knot may begin with securing one end of the chord 80 in the clamp 104. A free end of the chord 80 may be brought through the slot 112, through the eye of the hook, around the post 110, and around the catch 124. The free end of the chord 80 may be wrapped around the two chords several (e.g., 5 to 6) times. Next, the free end of the chord 80 may be passed between the two main chords by the hook with end line, through the channel 126 on the catch 124, and tightened halfway. The secured end of the chord 80 may be removed from the clamp 104 and the knot pulled tight.

The tool 100 may be used to tie an Antini knot. The Antini knot may begin with securing one end of the chord 80 in the clamp 104. A free end of the chord 80 may be brought through the slot 112, through the eye of the hook, and around the post 110. The free end of the chord 80 may be wrapped around the main chord several (e.g., 6 to 9) times. The chord 80 may then be moved around the catch 124. The free end of the chord 80 may be passed through the channel 126 multiple (e.g., 3) times and then through the slot 114. Next, the free end of the chord 80 may be passed through the channel 126 and tightened halfway. The secured end of the chord 80 may be removed from the clamp 104 and the knot pulled tight.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a base;
   a first clamp attached to a first end of said base and configured to secure a first chord;
   a second clamp attached to a second end said base and configured to secure a second chord;
   a first post attached to said first end of said base;
   a first slot in said first post opposite said base;
   a first notch disposed in a first corner of a first surface of said first post, wherein said first corner is opposite said base;
   a second post attached to said second end of said base;
   a second slot in said second post opposite said base;
   a rod rigidly attached to said first post;
   a catch attached to said rod opposite said first post; and
   a channel in said catch.

2. The apparatus according to claim 1, further comprising a second notch (i) disposed in a second surface of said second post and (ii) aligned in parallel with said first notch, wherein said second surface is opposite said base.

3. The apparatus according to claim 2, further comprising a groove (i) disposed in a second corner of said second surface and (ii) oriented perpendicular to said second notch.

4. The apparatus according to claim 3, further comprising a third notch (i) disposed in a third corner of said second post and (ii) oriented perpendicular to said second notch, wherein said third corner faces toward said first post.

5. The apparatus according to claim 4, further comprising a fourth notch (i) disposed in a fourth corner of said second post and (ii) oriented parallel to said third notch, wherein said fourth corner faces away from said first post.

6. The apparatus according to claim 1, wherein each of said first clamp and said second clamp comprises a rotatably actuated clamp configured to secure said first chord and said second chord.

7. A method for tying an Albright knot, comprising the steps of:
   providing a tool comprising a base, a first clamp attached to a first end of said base, a second clamp attached to a second end said base, a first post attached to said first end of said base, a first slot in said first post opposite said base, a second post attached to said second end of said base, a second slot in said second post opposite said base, a rod rigidly attached to said first post, a catch attached to said rod opposite said first post, and a channel in said catch;
   securing a second chord in said second clamp, through said second slot and in a loop around said catch;
   securing a first chord in said first clamp;
   passing said first chord through (i) said first slot, (ii) both said channel and said loop, and (iii) said second slot;
   wrapping said first chord a plurality of times around a portion of said second chord between said second post and said catch, wherein each of said plurality of times around advances said first chord from said second post toward said catch;
   passing said first chord through both said channel and said loop;
   releasing said first chord and said second chord from said first clamp and said second clamp; and
   tightening said first chord and said second chord to each other.

8. The method according to claim 7, wherein said plurality of times comprises six to twelve times.

9. A method for tying an Alberto knot, comprising the steps of:
   providing a tool comprising a base, a first clamp attached to a first end of said base, a second clamp attached to a second end said base, a first post attached to said first end of said base, a first slot in said first post opposite said base, a second post attached to said second end of said base, a second slot in said second post opposite said base, a rod rigidly attached to said first post, a catch attached to said rod opposite said first post, and a channel in said catch;
   securing a second chord in said second clamp, through said second slot and in a loop around said catch;
   securing a first chord in said first clamp;
   passing said first chord through (i) said first slot, (ii) both said channel and said loop, and (iii) said second slot;
   wrapping said first chord a plurality of first times around a portion of said second chord between said second post and said catch, wherein each of said plurality of first times around advances said first chord from said catch toward said second post;
   wrapping said first chord a plurality of second times around said portion of said second chord and over said first chord previously wrapped, wherein each of said plurality of second times around advances said first chord from said second post toward said catch;
   passing said first chord through both said channel and said loop;
   releasing said first chord and said second chord from said first clamp and said second clamp; and
   tightening said first chord and said second chord to each other.

10. The method according to claim 9, wherein said plurality of first times comprises six to twelve times.

11. The method according to claim 9, wherein said plurality of second times comprises six to twelve times.

* * * * *